United States Patent [19]
Ha

[11] Patent Number: 5,940,151
[45] Date of Patent: Aug. 17, 1999

[54] LIQUID CRYSTAL DISPLAY AND METHOD FOR FABRICATING THE SAME

[75] Inventor: Yong-Min Ha, Kyungki-do, Rep. of Korea

[73] Assignee: LG Electronics, Inc., Seoul, Rep. of Korea

[21] Appl. No.: 08/843,470

[22] Filed: Apr. 16, 1997

[30] Foreign Application Priority Data

Aug. 26, 1996 [KR] Rep. of Korea ........................ 96-35540

[51] Int. Cl.⁶ ............................. G02F 1/136; H01L 29/04
[52] U.S. Cl. ................................. 349/43; 349/42; 257/59; 257/72
[58] Field of Search .................................. 349/42, 43, 47, 349/149, 151; 257/59, 72

[56] References Cited

U.S. PATENT DOCUMENTS

| | | | |
|---|---|---|---|
| 5,250,931 | 10/1993 | Misawa et al. | 345/206 |
| 5,710,606 | 1/1998 | Nakajima et al. | 349/42 |
| 5,812,231 | 9/1998 | Kochi et al. | 349/151 |

*Primary Examiner*—William L. Sikes
*Assistant Examiner*—Joanne Kim
*Attorney, Agent, or Firm*—Morgan, Lewis & Bockius LLP

[57] ABSTRACT

A liquid crystal display includes a plurality of pixel TFTs in a matrix form on an insulating substrate, a plurality of drive circuit TFTs having a CMOS structure on the peripheral portion of the pixel TFTs, the drive circuit TFTs including a first conductivity type TFT having the structure the same as the pixel TFT and a second conductivity type TFT having a structure different from the pixel TFT, a plurality of signal lines connected to the pixel TFTs, and a plurality of scanning lines crossing the signal lines.

30 Claims, 15 Drawing Sheets

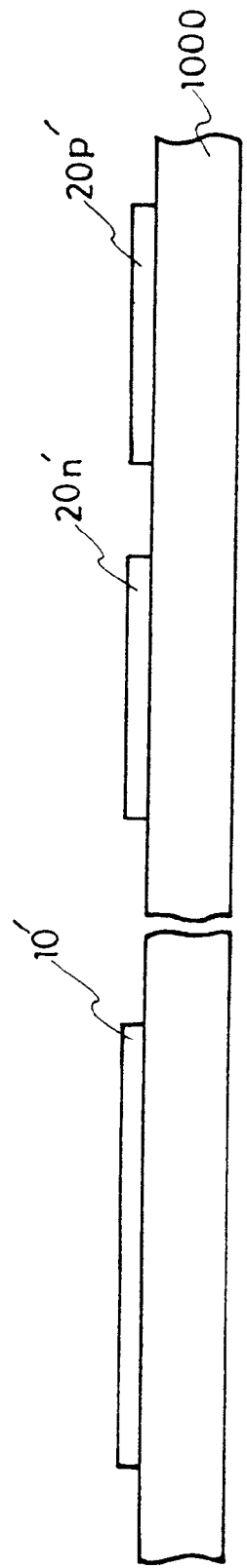
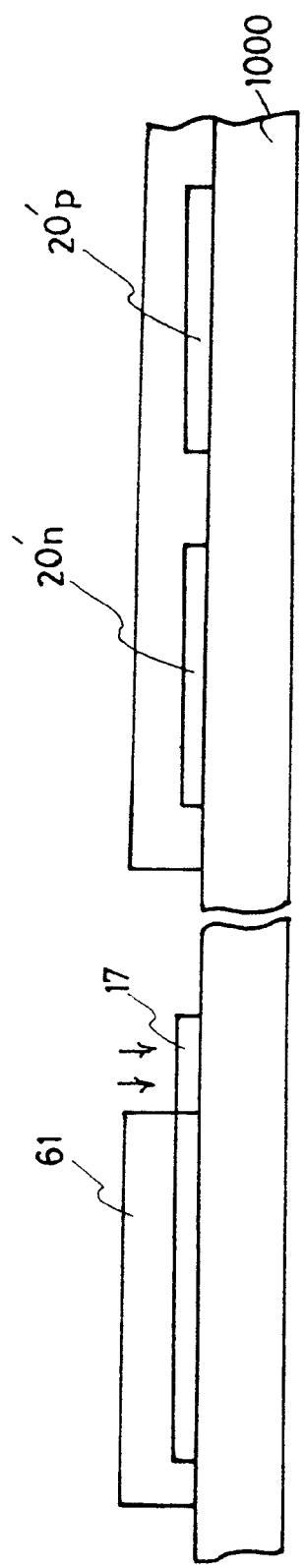

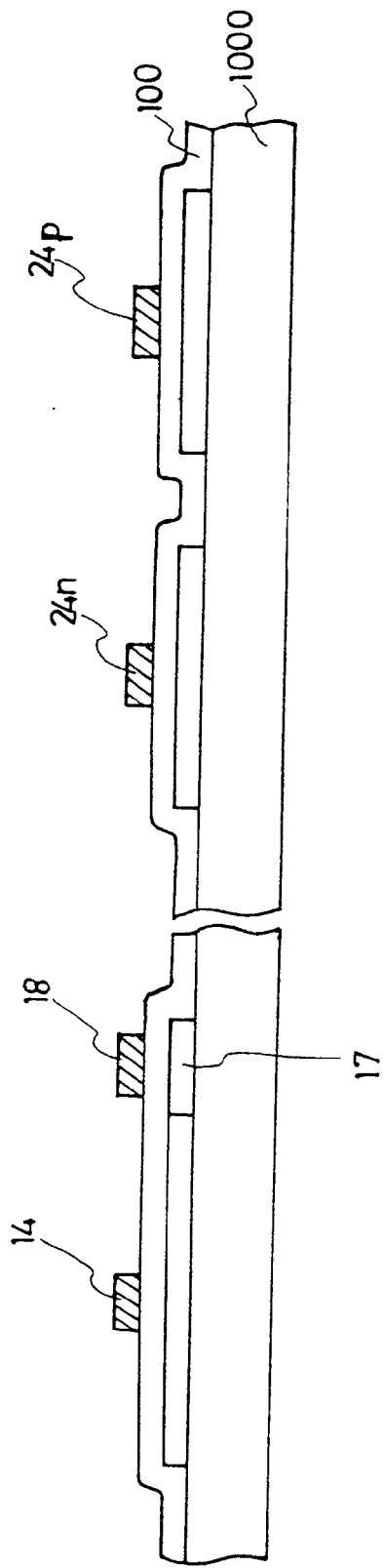
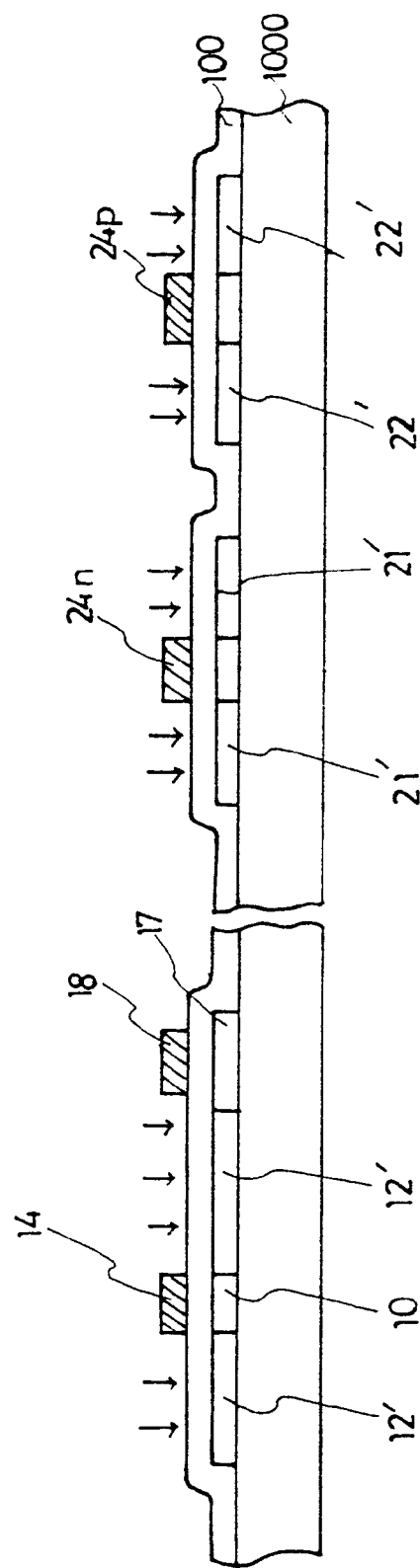

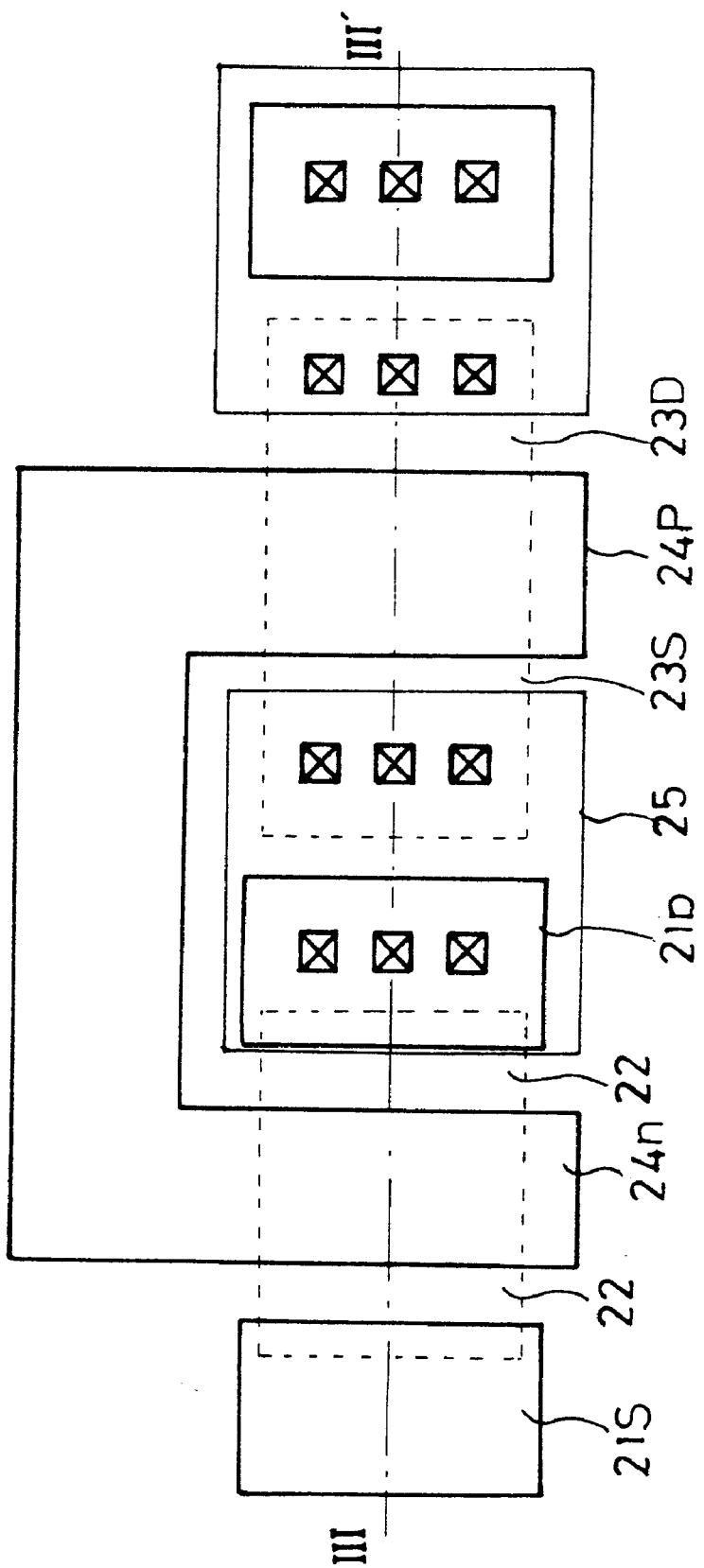

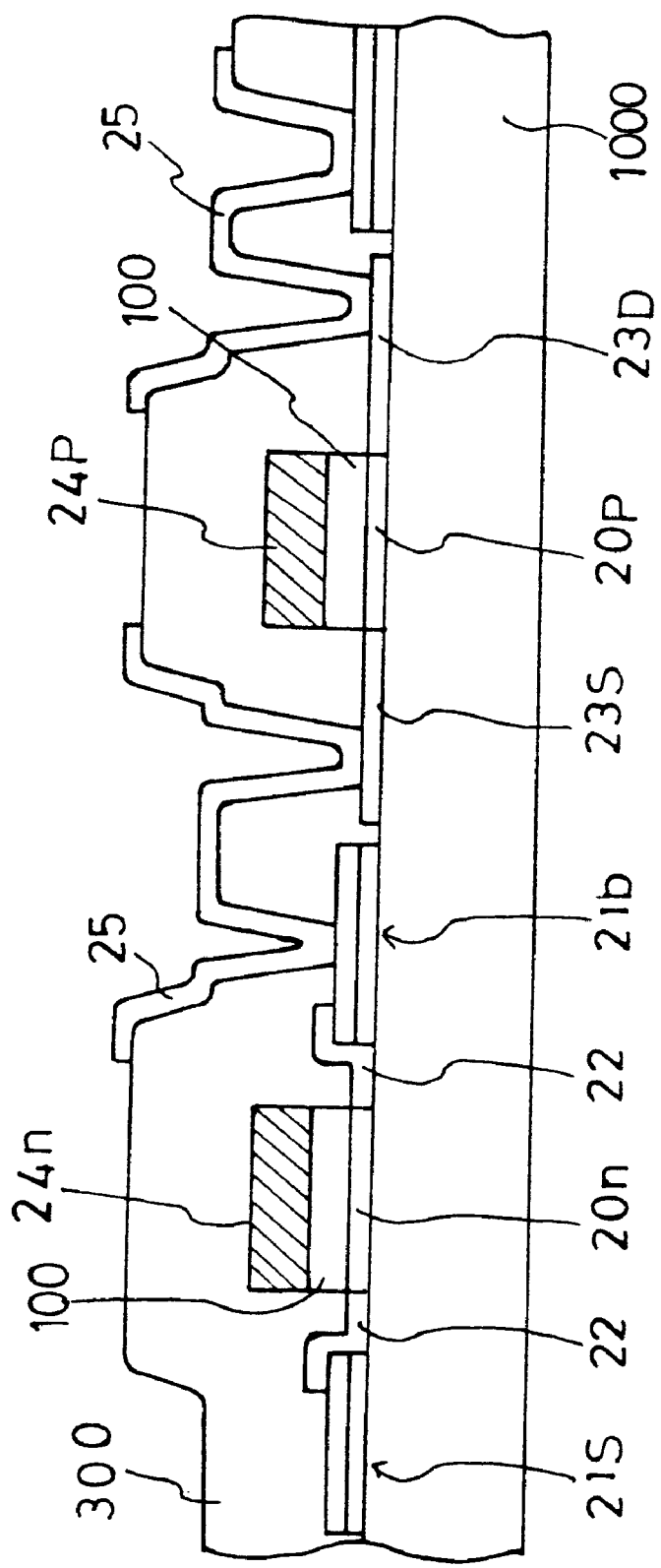

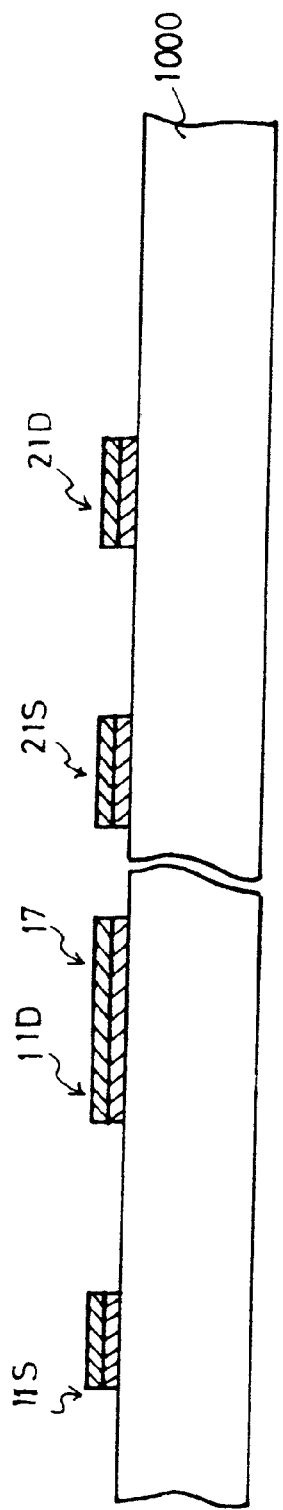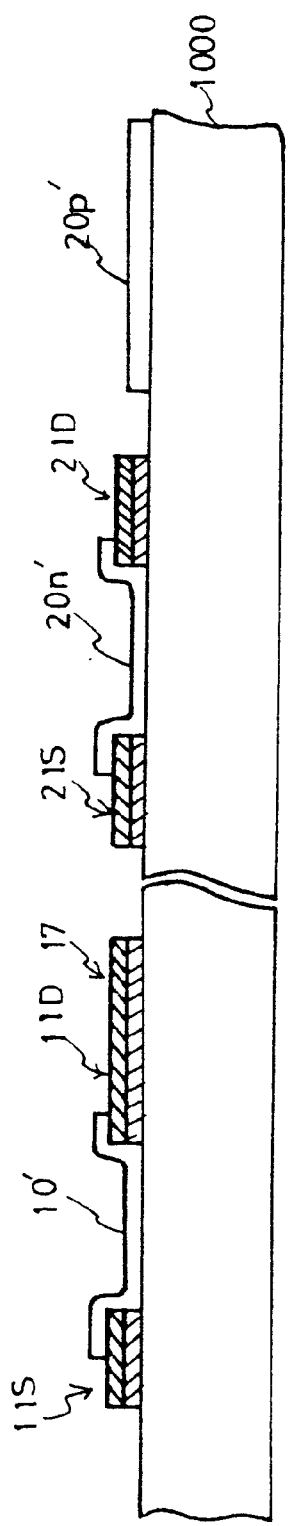

LIQUID CRYSTAL DISPLAY AND METHOD FOR FABRICATING THE SAME

BACKGROUND OF THE INVENTION

1. Field of the Invention

The present invention relates to a semiconductor device, and more particularly, to a liquid crystal display (LCD) and a method for fabricating the same.

2. Discussion of the Related Art

In a conventional LCD, an amorphous silicon (a—Si) has been a choice of material for a thin film transistor (TFT) to fabricate an LCD. However, a polysilicon becomes a substitute for the amorphous silicon for the TFT because the polysilicon has a carrier (electron or hole) mobility that is higher than that of the amorphous silicon. Additionally, the polysilicon TFT has an advantage of forming the driving circuit on the LCD panel during the fabrication of pixels. Also, a complimentary metal-oxide-semiconductor (CMOS) TFT is easily realized by the polycrystaline silicon.

Accordingly, in fabricating the polysilicon TFT-LCD, since most of the drive circuit is formed with the polysilicon TFT, driver ICs(Intergrated Circuits) do not need to be bonded to the LCD panel. Thus, fabricating the drive circuit and the pixel on the LCD panel simultaneously becomes a feasible process. Furthermore, the polysilicon TFT can be fabricated on a larger glass substrate at low temperature below 500° C. due to a recently developed crystallization technique using a eximer laser. As a result, the polysilicon TFT can be formed at similar fabrication temperature with the amorphous silicon TFT.

As described above, the polysilicon TFT-LCD employs a structure where the drive circuit portion and pixel portion are formed on the same glass substrate. The TFT at the drive circuit can be switched at high speed due to the high carrier mobility of the polysilicon TFT. However, since the TFT for switching the pixel has a high drain current at off-state, a TFT having a lightly doped drain (LDD), offset or dual gate structure has been suggested in order to reduce the off-current to a desirable level at the pixel portion.

FIG. 1 is an equivalent circuit diagram of a conventional LCD in which a drive circuit is formed on an insulating substrate. As shown in FIG. 1, a plurality of signal lines 5 and scanning lines 4 intersect with each other and are arranged in a matrix form at the pixel portion on a transparent substrate. A pixel electrode 6 and a TFT 9 for driving the pixel portion are formed at the intersection. A common electrode 8 for displaying pictures is formed on the other transparent substrate. Also, a storage capacitor 7 is formed to be electrically parallel with the pixel electrode 6 and the common electrode 8.

A gate drive circuit 1 and a data drive circuit 2 are formed at the periphery of the pixel portion. These circuits apply a desirable signal to the pixel portion. The gate drive circuit 1 and the data drive circuit 2 are simultaneously formed on the same insulating substrate.

FIG. 2A is a plan view of the pixel portion of a conventional LCD, and FIG. 2B is a cross-sectional view taken along line I—I' of FIG. 2A. A signal line 40 and a scanning line 50 intersect or cross each other on an insulating substrate 1000, and a source region 11S at the TFT is connected to the signal line 40. A drain region 11D is connected to a pixel electrode 15. The drain region 11D and a first storage capacitor electrode 17 are formed as one layer. A gate electrode 14 connected to the scanning line 50 is formed on a gate insulating layer 100. A second storage capacitor electrode 18 forms a storage capacitor together with the first storage capacitor electrode 17. A gate insulating layer 100 is formed between the first and second capacitor electrodes. The second storage capacitor electrode 18 and the gate electrode 14 are formed of a same material and the same layer.

Source and drain regions 11S and 11D of the TFT are heavily doped regions with N-type or P-type ions. An LDD region 12 is formed adjacent to the heavily doped region so as to reduce the leakage current when the TFT is at the off-state. Reference numeral 200 designates an interlevel insulating layer, and reference numeral 300 designates a passivation layer.

FIGS. 3A to 3H are cross-sectional views showing process steps of fabricating the conventional LCD. In these drawings, the left portion shows the TFT for the pixel and the right portion shows the CMOS-TFT for the drive circuit portion.

As shown in FIG. 3A, a polysilicon is formed on a substrate 1000 and patterned to form semiconductor layers 10', 20n' and 20p' on the pixel and drive circuit portions, respectively. The semiconductor layer 10' corresponds to the pixel portion, and the semiconductor layers 20n' and 20p' are for the drive circuit portion. The semiconductor layers 20n' and 20p' are used to form an N-type TFT and P-type TFT, respectively.

As shown in FIG. 3B, a predetermined type of impurity is selectively implanted into the semiconductor layer 10' (which will be an active layer 10 at the pixel portion) to form a first storage capacitor electrode 17. The type of impurity to be doped is the same as that of the source and drain regions which are formed as follows. For example, for a pixel TFT of an N-type, N-type impurity ions are selectively implanted only into the first storage capacitor electrode region using a photoresist 61 as a mask. Thereafter, the photoresist 61 is removed, and the first storage capacitor electrode region is irradiated by a laser or heated by a conventional method in order to activate the impurity ions implanted in the previous step.

As shown in FIG. 3C, an insulating material including silicon oxide or silicon nitride is deposited on the substrate 1000 including the first storage capacitor electrode 17 to form a gate insulating layer 100. Successively, a metal such as Al, Al alloy, Mo, or Cr is deposited on the gate insulating layer 100 and patterned through photolithography to form a gate electrode 14 for the pixel TFT and gate electrodes 24n and 24p for the drive circuit TFT on the gate insulating layer 100. In this process, a second storage capacitor electrode 18 is also formed at the pixel portion. That is, the gate electrode 14 and the second storage capacitor electrode 18 are formed using the same material.

As shown in FIG. 3D, N-type impurities are doped lightly into the exposed surface over the substrate to form the LDD TFT. In the process of implanting the impurities, the gate electrodes 14, 24n, and 24p act as masks to block the ions. Thus, an n⁻ layer 12', 21' and 22' and channel layers 10, 20n, and 20p are formed in semiconductor layers 10', 20n', and 20p' (shown in FIG. 3A), respectively.

Alternatively, when n⁻ impurities are doped with a low ion implantation energy, an insulating layer including a silicon oxide layer or a silicon nitride layer and a metal layer such as Al, Al alloy, Mo, or Cr are sequentially formed on the substrate. Then, the insulating layer and the metal layer are patterned simultaneously. As a result, the gate insulating layer 100 and the gate electrodes 14, 24n, and 24p are formed in the same patterning process, and a portion of the semiconductor layers 10', 20n', and 20p' are exposed as shown in FIG. 3X. Thereafter, N-type impurities are doped with a low ion implantation energy into the exposed surface over the substrate. Accordingly, the exposed portions of the semiconductor layers 12', 21', and 22', which are not blocked by the gate electrodes, is lightly doped with impurities and becomes the n⁻ layer. Furthermore, the channel layers 10, 20n, and 20p are formed at portions of the semiconductor layer below the gate electrodes 14, 24n, and 24p. Thus, in the alternative embodiment, the impurities are directly implanted into the semiconductor layer unlike the process shown in FIG. 3D.

As shown in FIG. 3E, a photoresist is coated on the exposed surface over the substrate and patterned to form a photoresist pattern 62 to cover a P-type TFT region at the drive circuit and the gate electrode 14 and a portion of the semiconductor layer at the pixel TFT. Then, N-type impurities are heavily doped using the photoresist pattern as a mask. In this process, since the photoresist pattern 62 is formed on the pixel portion to cover the gate electrode 14 and a portion of the semiconductor layer, the impurities are selectively doped into a portion of the n⁻ layer. Accordingly, source 11S and drain 11D are formed to have a heavily doped n⁺ layer and a lightly doped n⁻ layer 12 in the semiconductor layer at the pixel portion to complete an LDD structure.

On the other hand, at the drive circuit portion, the P-type TFT region is covered with photoresist pattern 62 and the n⁺ doping is carried out on a portion of the semiconductor layer at the N-type TFT region to form source and drain regions 21S and 21D and an N-type channel 20n. Accordingly, the TFT having an LDD structure with the n⁺ and n⁻ layers is formed at the pixel portion, while the N-type TFT having the n⁺ layer and the P-type TFT having the p⁺ layer are formed at the drive circuit portion.

As shown in FIG. 3F, after the photoresist pattern 62 is removed, another photoresist is coated on the substrate and patterned to form a photoresist pattern 63. The photoresist pattern 63 covers a large portion and exposes the P-type TFT region at the drive circuit portion. Then, P-type impurities are heavily doped into the substrate using photoresist pattern 63 as a mask. As a result, source and drain regions 23S and 23D are formed having a p⁺ layer, and a P-type channel region 20p is formed in a portion of the semiconductor layer at the P-type TFT region in the drive circuit portion.

The above-mentioned impurity doping method is called a counter doping. In the n⁻ doping (FIG. 3D), the concentration of the ion doped into the semiconductor is approximately $10^{16} \sim 10^{18}/cm^3$ for $n^{31}$ doping and about $10^{10} \sim 10^{21}/cm^3$ for p⁻ doping. Accordingly, the n⁻ layer is converted to p⁺ layer by the p⁺ doping.

As shown in FIG. 3G, after the remaining photoresist pattern 63 is removed, an insulating layer, for example, a silicon nitride layer, is formed on the exposed surface over the substrate 1000 to form an inter-layer insulating layer 200. Then, the inter-layer insulating layer 200 is patterned to form contact holes over a source region 11S at the pixel portion and source regions 21S and 23S and drain regions 21D and 23D at the drive circuit portion. A metal such as Al is deposited on the substrate and patterned to form a signal line 40 connected to the source region 11S at the pixel portion. A metal line 25 for connecting the source and drain regions at the drive circuit is formed in order to form a CMOS-TFT with the N-type and P-type TFTs at the drive circuit portion. Accordingly, the LDD structured TFT and the CMOS-TFT are formed at the pixel portion and the drive circuit portion, respectively.

As shown in FIG. 3H, an insulating layer is formed on the exposed surface over the substrate to form a passivation layer 300. Thereafter, a portion of the gate insulating layer 100, the inter-layer insulating layer 200, and the passivation layer 300 on a drain region 11D are selectively etched through photolithography to form a contact hole over the drain region 11D. Then, an Indium Tin Oxide (ITO) is deposited on the exposed surface over the substrate and patterned to form a pixel electrode 15.

After the aforementioned process of fabricating a bottom substrate for the LCD, a top plate including a color filter is fabricated through a separate process. Then, after the two plates are bonded to each other, liquid crystal is injected between the two plates to complete the TFT-LCD.

The above-described conventional TFT-LCD employs a CMOS-TFT as a drive circuit TFT for a better circuit performance. Also, the storage capacitor is formed on the pixel portion using the gate insulating layer formed between the active region and the gate electrode to improve the picture quality. Thus, the conventional method for fabricating the TFT-LCD requires at least nine steps of the photoresist and mask alignment to fabricate the TFT substrate.

As a result, since the number of process steps is increased, the productivity and the yield are decreased dramatically. Moreover, with regard to the switching operation at the pixel TFT, leakage current of the polysilicon TFT is large at an off-region. Thus, the LDD structure must be formed using additional photoresist steps. This makes the fabricating process very complicated, and drives up the production cost.

SUMMARY OF THE INVENTION

Accordingly, the present invention is directed to an LCD and a method for fabricating the same that substantially obviates one or more of the problems due to limitations and disadvantages of the related art.

An object of the present invention is to provide an LCD having a reduced number of fabrication steps, thereby improving productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a plurality of pixel TFTs in a matrix form on an insulating substrate, a plurality of drive circuit TFTs having a CMOS structure on the peripheral portion of the pixel TFTs, the drive circuit TFTs including a first conductivity type TFT having the structure the same as the pixel TFT and a second conductivity type TFT has a structure different from the pixel TFT, a plurality of signal lines being connected to the pixel TFTs, and a plurality of scanning lines being intersected to the signal lines.

In another aspect of the present invention, a liquid crystal display includes a plurality of pixel TFTs in a matrix form on an insulating substrate, the pixel TFTs having an LDD region or offset region, source and drain electrode, and a first and second storage capacitor electrode, a plurality of drive circuit TFTs having a CMOS structure, the peripheral portion of the pixel TFTs a first conductivity type TFT having source and drain electrode below an active layer, a second-type TFT having source and drain electrode on the active layer, a plurality of signal lines being connected to the pixel TFTs, and a plurality of scanning lines being intersected to the signal lines.

In another aspect of the present invention, a method for fabricating a liquid crystal display, the method includes the steps of forming a pixel TFT and a first conductivity type TFT at a drive circuit portion having the same conductivity as a channel at the pixel TFT over a substrate, forming active layers at the pixel TFT and the first conductivity type TFT and for a second conductivity type TFT at the drive circuit portion, forming gate electrodes over the substrate and a storage capacitor electrode at the pixel TFT, doping the first impurity to the active layers at the pixel TFT and the first conductivity type TFT and the second conductivity type TFT at the drive circuit portion, injecting a second impurity to the active layer at the second conductivity type TFT at the drive circuit portion, forming an insulating layer over the substrate, the insulating layer having contact holes over a drain electrode at the pixel TFT and source and drain regions at the drive circuit portion, and forming an ITO connecting the drain electrode at the pixel TFT and connecting the first and second conductivity type TFTs at the drive circuit portion.

In a further aspect of the present invention, the method forming a first semiconductor layer and a first metal layer over an insulating substrate, patterning the first semiconductor layer and the first metal layer to form source and drain electrodes at a pixel TFT portion and a first conductivity type TFT at the drive circuit portion, the first conductivity type TFT having the same conductivity as a channel at pixel TFTS, forming an active layer on an exposed surface over the substrate, patterning the active layer at the pixel TFT and the first and second conductivity type TFTs at the drive circuit portion, forming a first insulating layer and a second metal layer on an exposed surface over the substrate, patterning the first insulating layer and the second metal layer to form gate electrodes on the active layer, injecting a first impurity into the active layer using the gate electrodes as masks, injecting a second impurity into the active layer of the second conductivity type TFT at the drive circuit to form source and drain regions of the second conductivity type TFT at the drive circuit portion, the second impurity being doped with a concentration higher than the first impurity, forming a second insulating layer on an exposed surface over the substrate as a passivation layer, patterning the passivation layer to form contact holes over the drain electrode of the pixel TFTS, source and drain electrodes of the first conductivity type TFT and the second conductivity type TFT at the drive circuit portion, forming a transparent conductive layer on an exposed surface over the substrate, and patterning the transparent conductive layer to form a pixel electrode and a transparent conductive line, the pixel electrode being connected to the drain electrode of the pixel TFTs and the transparent conductive line connecting the first conductivity type TFT with the second conductivity type TFT at the drive circuit to form a CMOS-TFT.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3H and FIG. 3X are cross-sectional views illustrating the process steps of fabricating a conventional LCD;

FIGS. 5A and 5B are a plan view and a cross-sectional view, respectively, illustrating a CMOS-TFT structure forming a drive circuit portion of an LCD according to the present invention; and FIGS. 6A to 6E are cross-sectional views illustrating the process steps of fabricating an LCD according to the present invention.

DETAILED DESCRIPTION OF PREFERRED EMBODIMENT

Reference will now be made in detail to the preferred embodiments of the present invention, examples of which are illustrated in the accompanying drawings.

In a TFT-LCD according to the present invention, an N-type TFT is formed at a pixel portion, and a CMOS-TFT is formed at a drive circuit portion. In realizing the TFT-LCD of the present invention, channel regions of TFTs at the drive circuit and the pixel portion have the same conductivity for a stagger type, and channel regions of TFTs at the drive circuit and the pixel portion have the opposite conductivity to each other for a coplanar type. The TFT-LCD having the aforementioned structures according to the present invention will be explained below. Here, the pixel TFT is an N-type.

Figure 1:
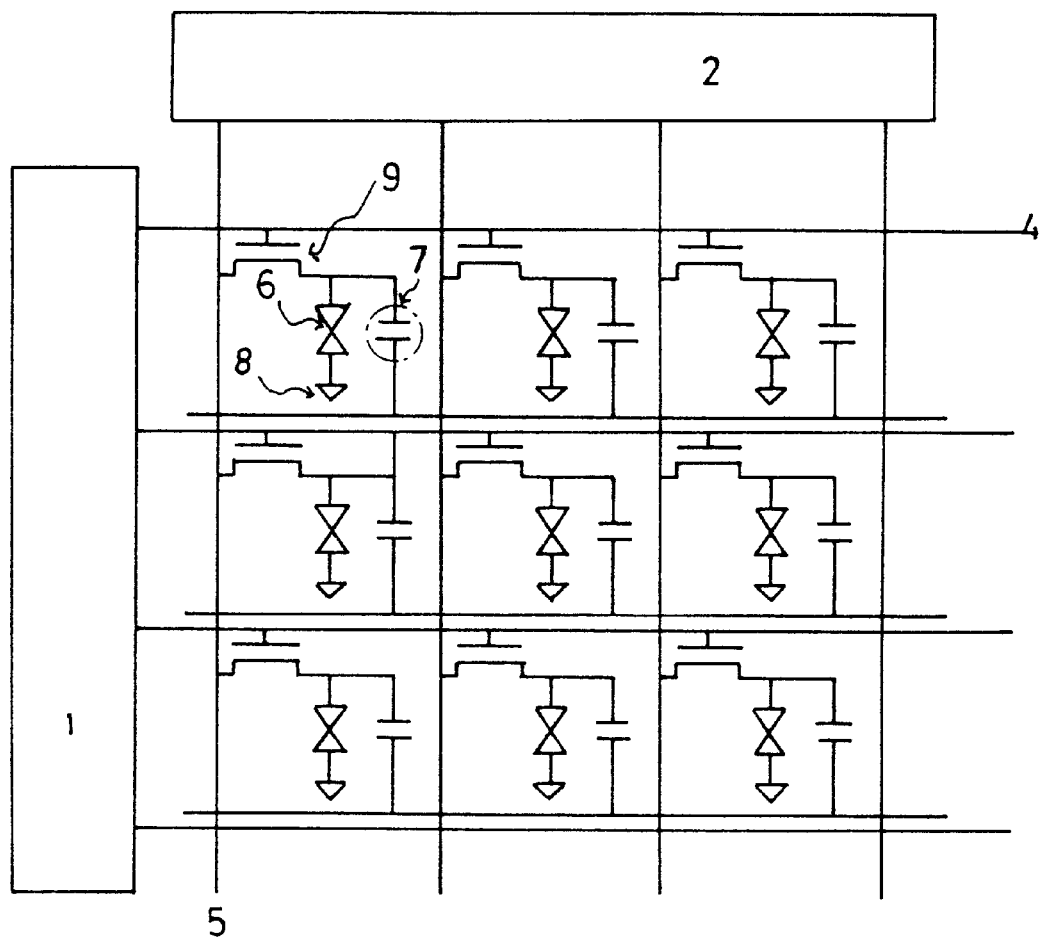
FIG. 1 is an equivalent circuit diagram of an LCD including drive circuits.
Figure 2A:
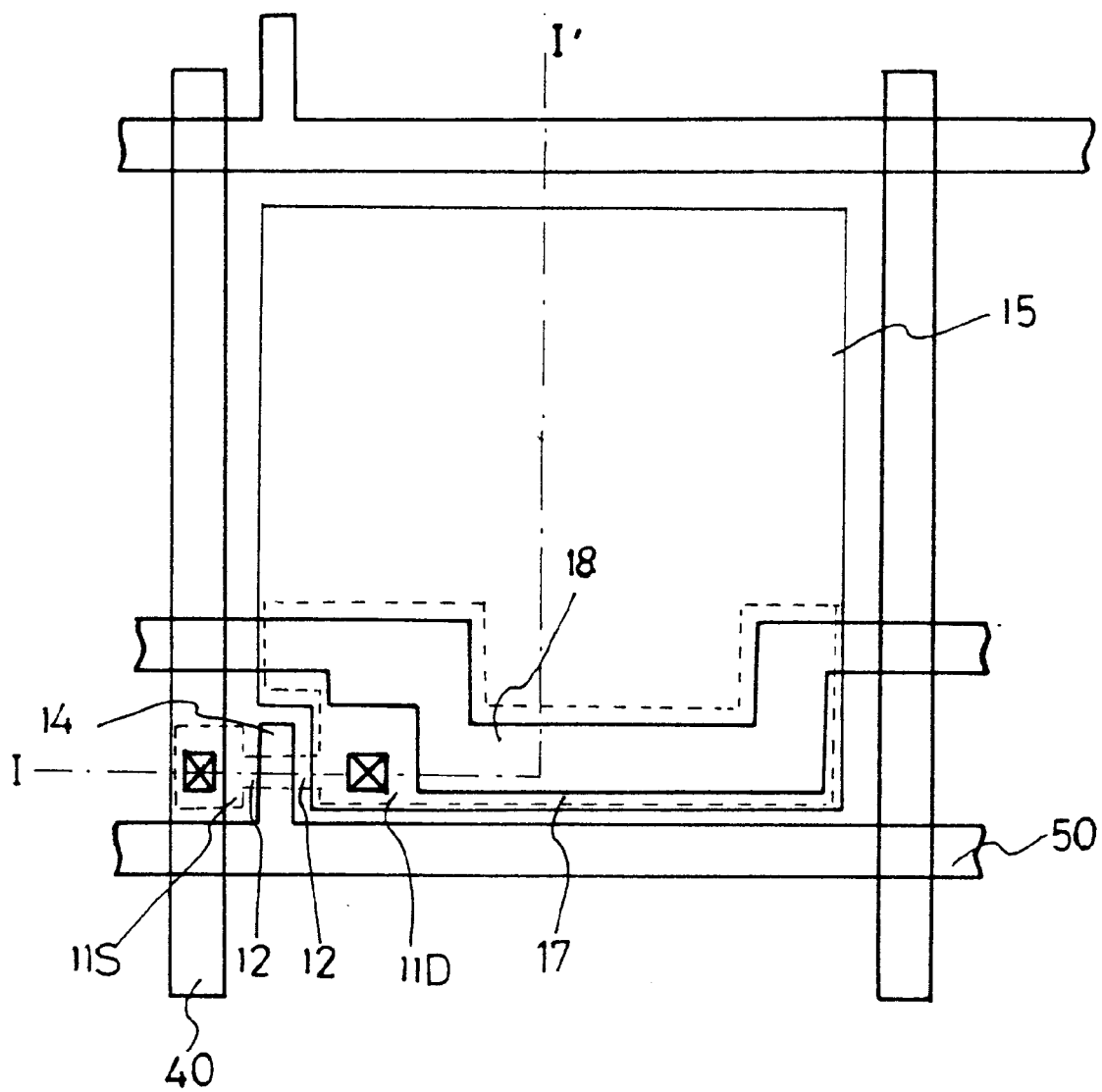
FIGS. 2A and 2B are a plan view and a cross-sectional view, respectively, illustrating a pixel portion of a conventional LCD.
Figure 2B:
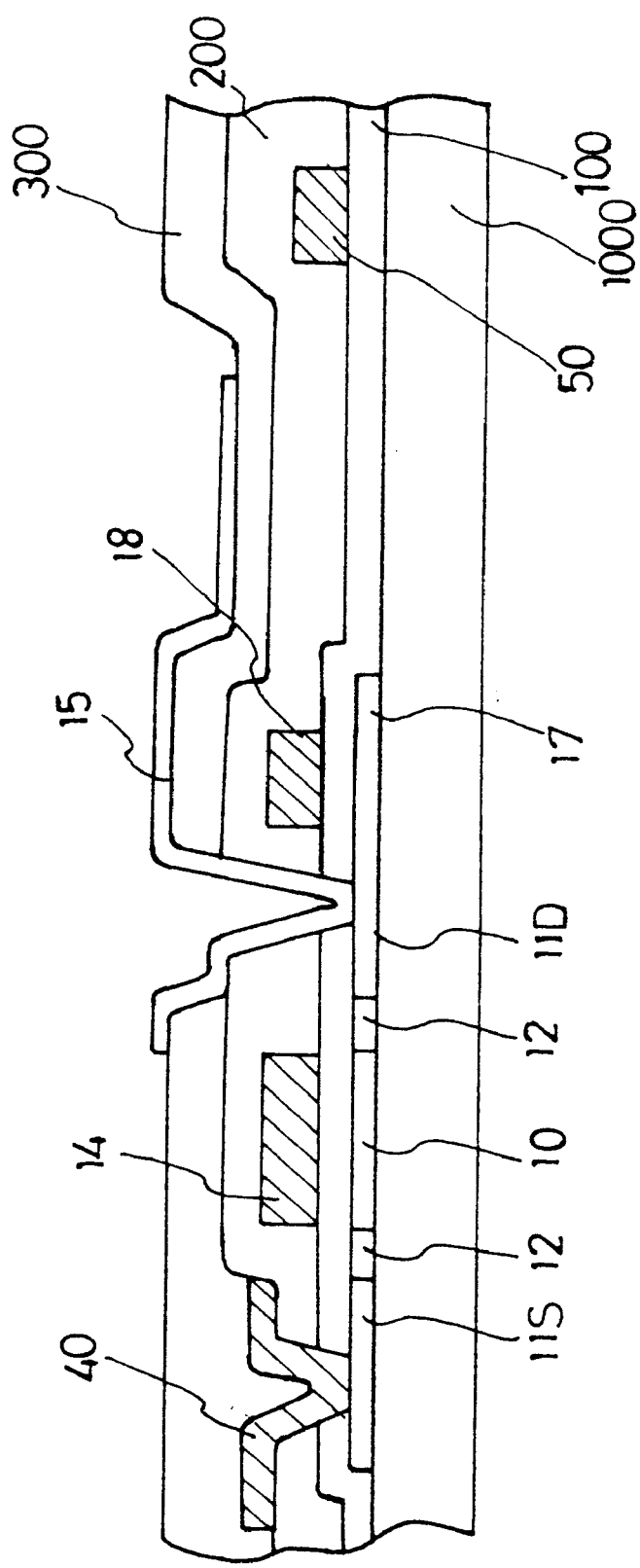
Figure 3X:
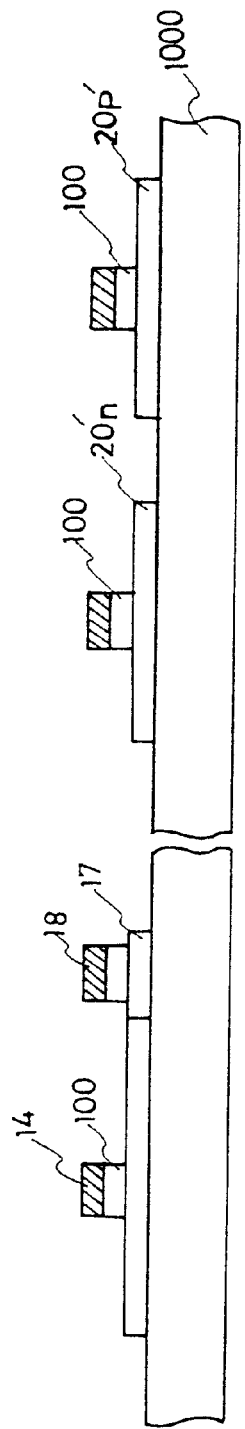
Figure 3E:
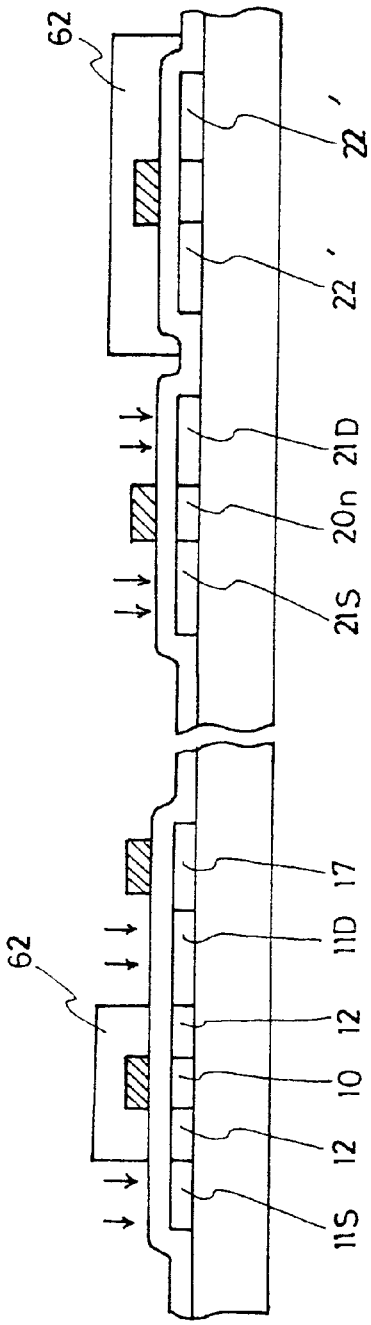
Figure 3F:
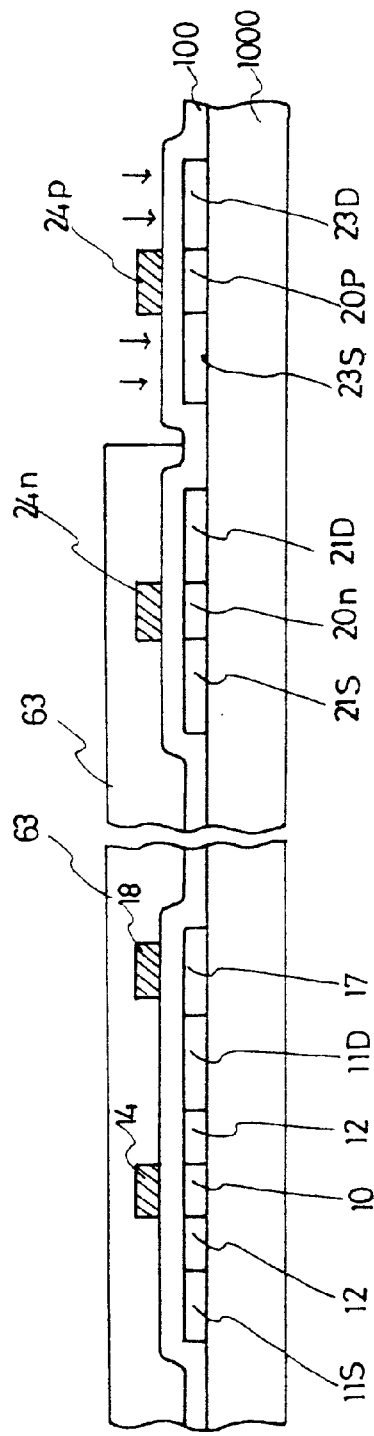
Figure 3G:
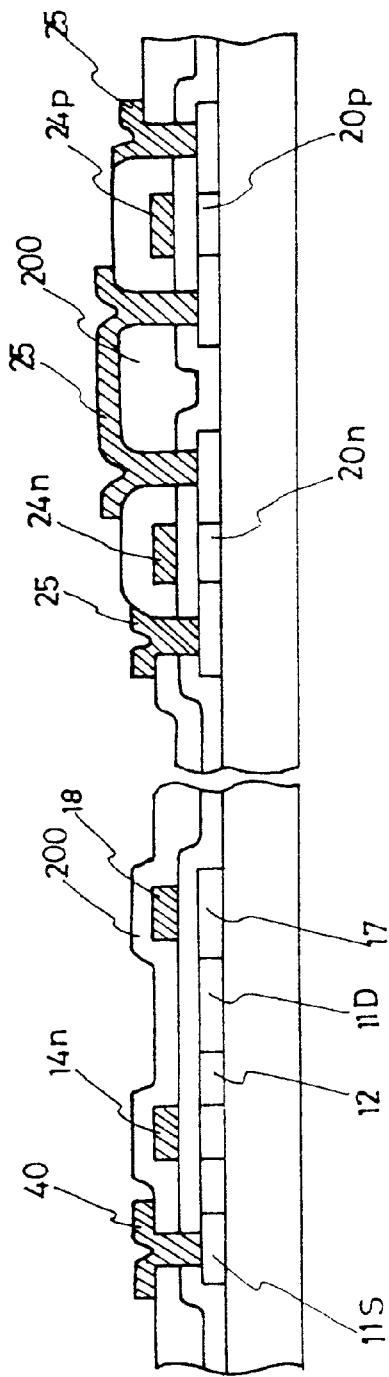
Figure 3H:
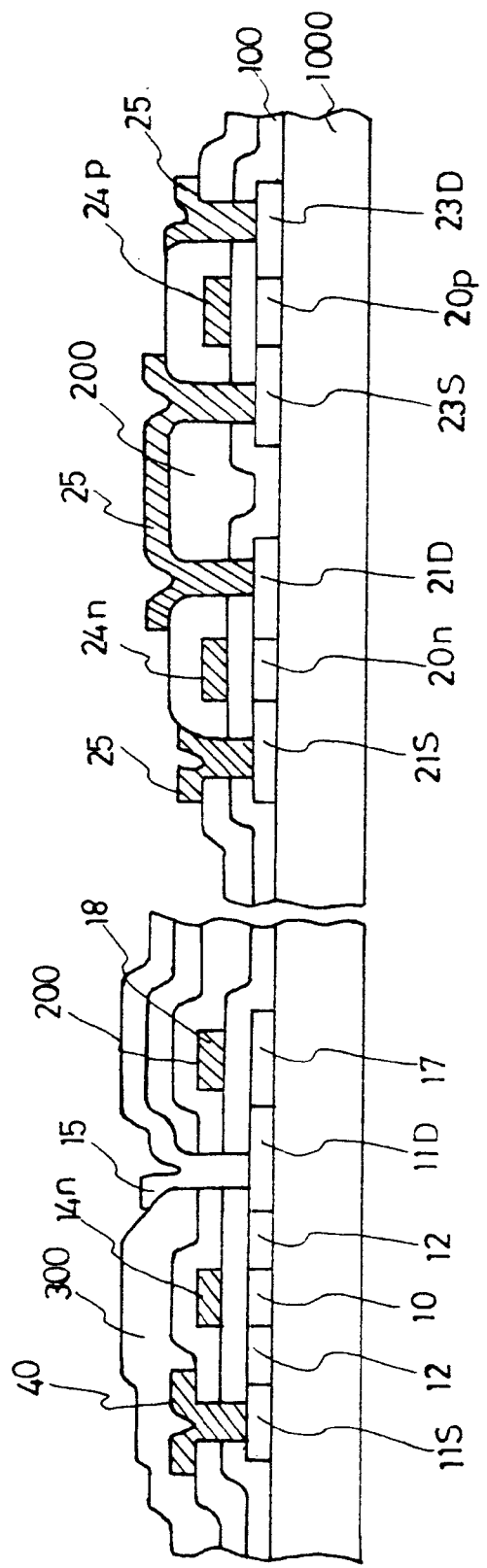
Figure 4A:
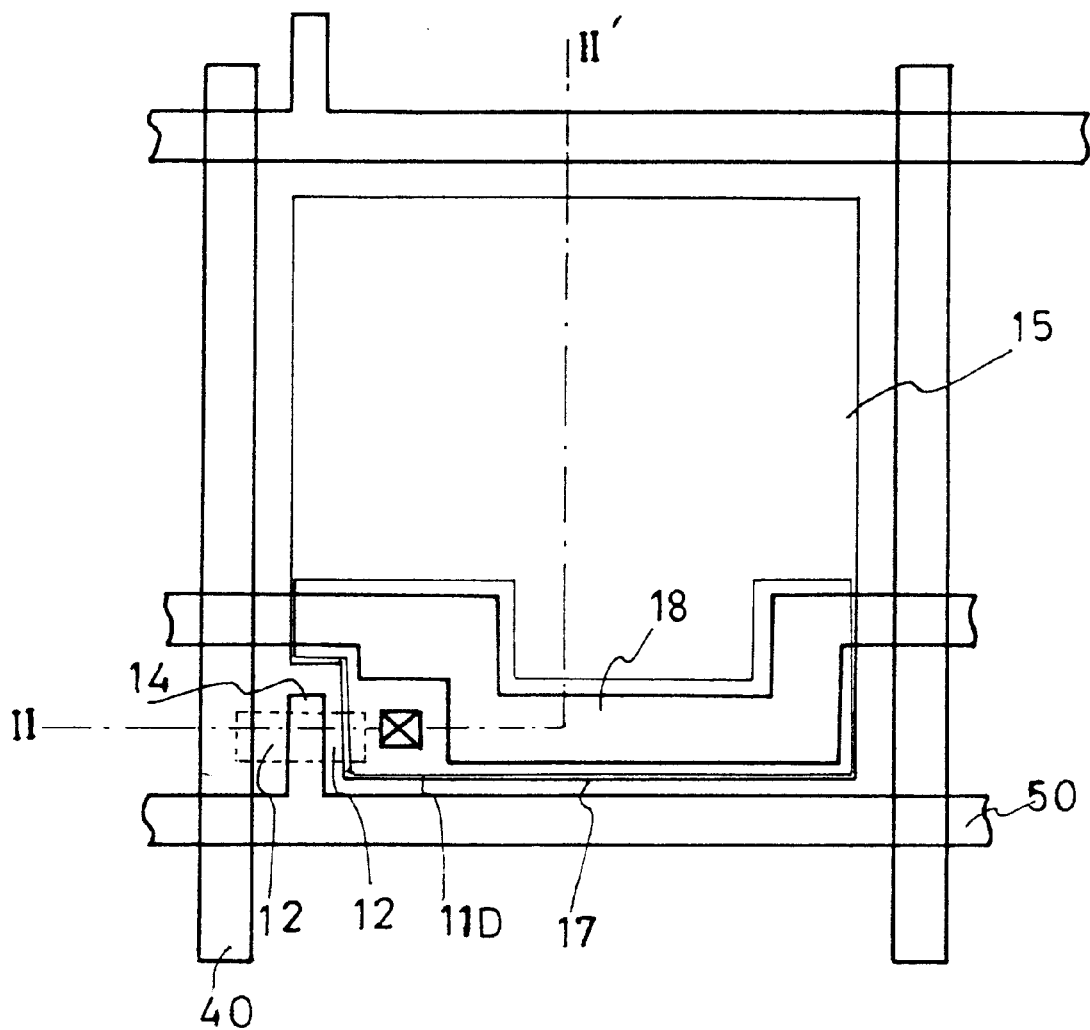
FIGS. 4A and 4B are a plan view and a cross-sectional view, respectively, illustrating a pixel portion of an LCD according to the present invention.
Figure 4B:
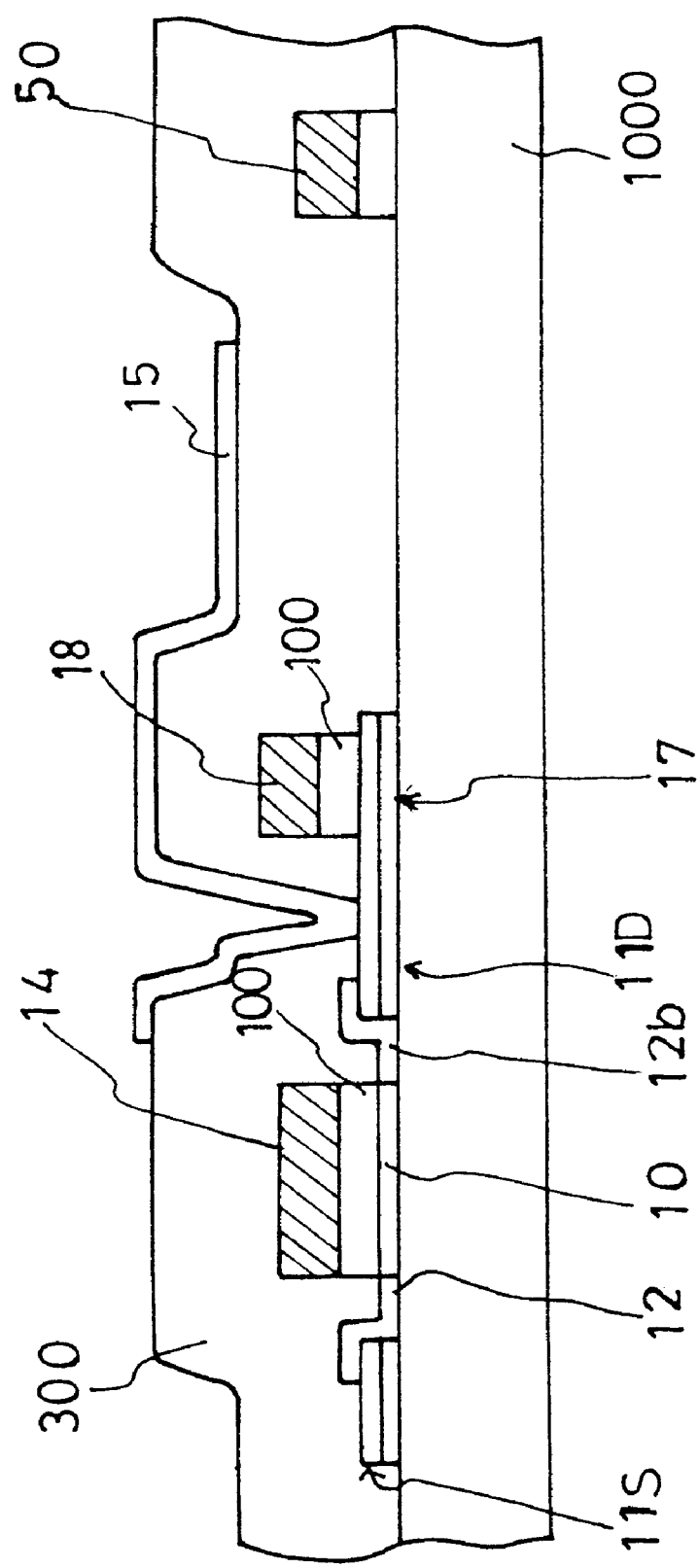

FIG. 4A is a plan view illustrating the pixel portion at the LCD according to the present invention, and FIG. 4B is a cross-sectional view along the line II—II' in FIG. 4A. A scanning line 50 and a signal line 40 intersect or cross each other on an insulating layer 1000, and a stagger type TFT is formed at the intersection. Source and drain electrodes 11S and 11D at the TFT are formed as a dual-level or double-level layer using an N-doped silicon ($n^+$—Si) layer and a metal layer. Here, a first storage capacitor electrode 17 and drain electrode 11D are formed as the same layer. A storage capacitor includes a second storage capacitor electrode 18 over the first storage capacitor electrode 17. A gate insulating layer 100 is formed between the first and second capacitor electrodes. A contact hole is formed at a predetermined portion of a passivation layer 300, and a transparent pixel electrode 15 is connected to the drain electrode 11D through the contact hole.

A lightly doped LDD region or undoped offset region 12 is formed between a channel region 10 and source/drain electrodes 11S and 11D at the TFT in order to reduce the leakage current when the TFT is at an off state. If the length of the offset region is longer than about 1 $\mu$m, the on-current of the offset TFT decrease. On the other hand, the doping is not needed if the length of the offset region is less than about 1 $\mu$m.

FIG. 5A is a plan view of the drive circuit portion at the TFT-LCD according to the present invention, and FIG. 5B is a cross-sectional view taken along the line III—III' in FIG. 5A. The TFT-LCD includes two CMOS-TFT having a gate electrode and source/drain electrodes on insulating substrate 1000. As described above, for the stagger type pixel TFT having an N-channel, the N-type TFT at the drive circuit is formed as the stagger type. On the contrary, the P-type TFT at the drive circuit is formed as the coplanar type different from the pixel TFT.

The N-type TFT at the drive circuit has source and drain electrodes 21S and 21D forming a dual-level layer with a doped silicon (n$^+$—Si) layer and a metal layer. An LDD region or undoped offset region 22 is formed between channel region 20n and source/drain electrodes 21S and 21D at the N-type TFT. On the other hand, the P-type TFT has source and drain regions 23S and 23D including a heavily doped impurity region.

The source/drain electrodes at the N-type TFT and P-type TFT are connected with a transparent conductive line 25. This conductive line is preferably formed by the same material as the pixel electrode. Also, the conductive line and pixel electrode are preferably formed on the same level.

FIGS. 6A to 6E are cross-sectional views showing the process steps of fabricating the TFT-LCD according to the present invention. In the TFT-LCD of the present invention, the channel regions of TFTs at the drive circuit and the pixel portions have the same conductivities for the stagger type and opposite conductivities for the coplanar type.

As shown in FIG. 6A, an N-doped semiconductor layer and a metal layer are sequentially formed on an insulating substrate 1000 and selectively etched through photolithography to form source and drain electrodes 11S and 11D, a first storage capacitor electrode 17, and source and drain electrodes 21S and 21D of the N-type TFT at the drive circuit. Here, The doped semiconductor layer and the metal layer can be simultaneously patterned in order to reduce the resistance of the source and drain electrodes and to use a portion of or an entire metal layer. The doped semiconductor layer may be formed through in-situ doping. Alternatively, after an undoped semiconductor layer is formed, a doping process such as ion doping may be carried out.

As shown in FIG. 6B, a polysilicon thin film is formed on the overall surface over the substrate. The polysilicon thin film is formed in such a manner that an amorphous silicon is deposited and crystallized through a solid state crystallization method or a laser crystallization using a solid or vapor laser. Furthermore, a low temperature polysilicon thin film can be used instead of the amorphous silicon.

Thereafter, the polysilicon thin film is selectively etched through photolithography to form a semiconductor layer 10' at the pixel TFT and semiconductor layers 20n' and 20p' at the drive circuit TFT. Here, the polysilicon thin film is patterned to expose a portion of source and drain electrodes 11S and 11D at the pixel TFT and a portion of source and drain electrodes 21S and 21D at the drive circuit TFT. For the pixel TFT portion, the drain electrode 11D is exposed more than the source electrode 11S. This is for forming a storage capacitor including a first storage capacitor electrode 17 and a second storage capacitor electrode 18. Semiconductor layer 20p' is formed on a predetermined portion of the P-type TFT at the drive circuit.

Figure 6C:
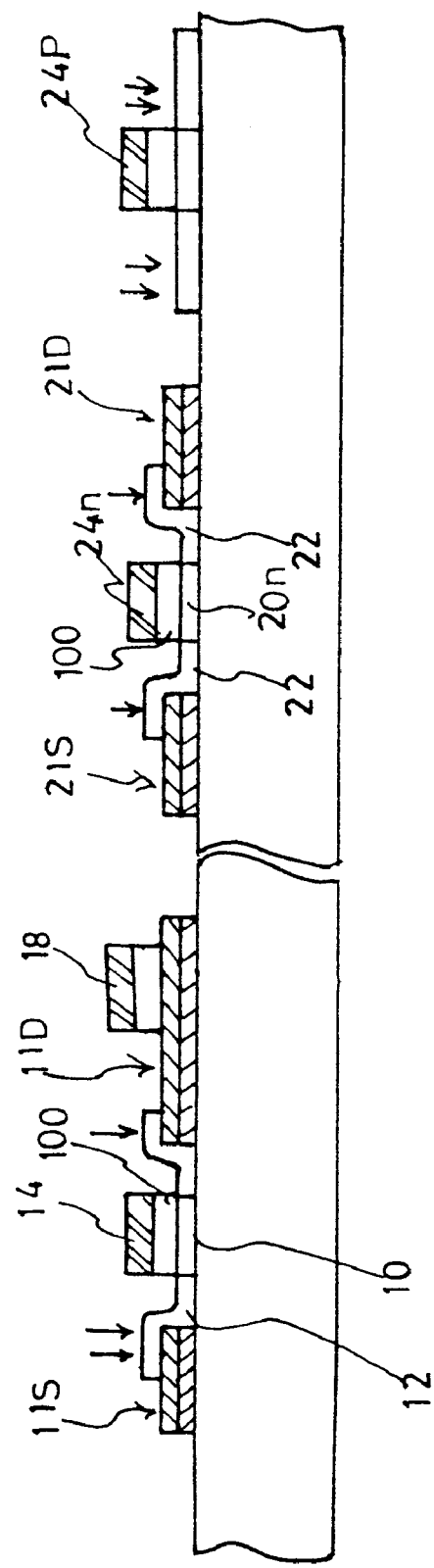

As shown in FIG. 6C, an insulating layer, such as a silicon oxide layer or a silicon nitride layer, is formed and then a metal layer including Al or Cr, or a semiconductor layer is formed over the substrate on the insulating layer. Then, the semiconductor layer or the metal layer is selectively etched through photolithography to form gate electrodes 14, 24n, and 24p. The insulating layer is etched using the gate electrodes as a mask to form a gate insulating layer 100. That is, the gate insulating layer 100 is between the gate electrodes 14, 24n and 24p and the substrate. A second storage capacitor electrode 18 is formed together with the gate electrodes to form the storage capacitor with the first storage capacitor electrode 17.

For the pixel TFT, gate electrode 14 is formed such that channel region 10 is not superposed on the source and drain electrodes 11S and 11D. On the other hand, for the N-type TFT at the drive circuit, the gate electrode 24n is formed such that a channel region 20n is superposed on the source and drain electrodes 21S and 21D, or that any non-superposed region is minimized.

Thereafter, N-type impurities are lightly doped into the substrate including the pixel TFT and N-type TFT and P-type TFT at the drive circuit. As a result, an N-layer is formed between the channel region and the source/drain electrodes of each TFT using the gate electrodes as a mask. The doping process may not be necessary if the offset region is accurately controlled through a self-alignment method. Here, the N-layer of the pixel TFT becomes LDD region 12. The N-layer of the N-type TFT at the drive circuit also becomes an LDD region 22 because it preferably has the same structure as the pixel TFT.

Figure 6D:
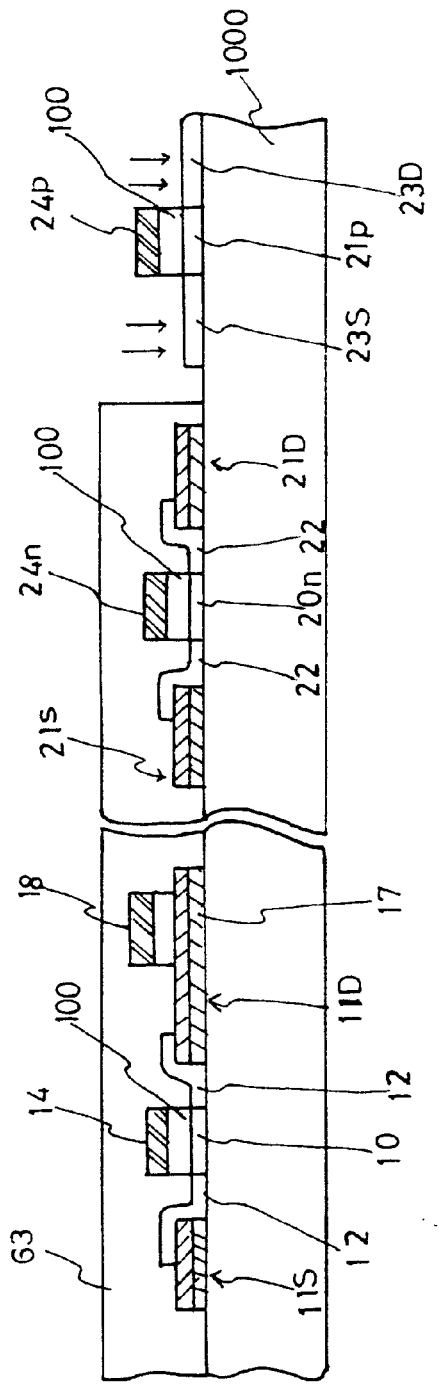

As shown in FIG. 6D, a photoresist pattern 63 is selectively formed on the N-type TFT at the pixel and drive circuit regions in order to form the P-type TFT. Then, P-type impurities are implanted into a portion of the semiconductor layer on the P-type TFT to form source and drain regions 23S and 23D. Thereafter, the photoresist pattern is removed and the implanted impurities are activated.

Figure 6E:
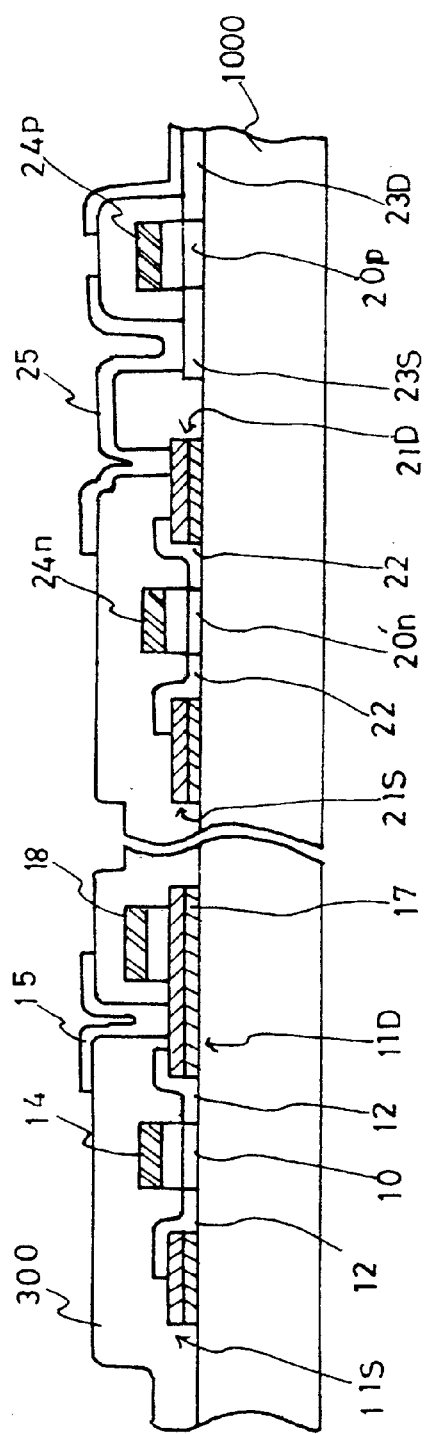

As shown in FIG. 6E, an insulator such as a silicon oxide or a silicon nitride is deposited on the overall surface over the substrate to form a passivation layer 300. The passivation layer 300 is selectively etched through photolithography to form contact holes for exposing drain electrode 11D at the pixel TFT and the source/drain regions at the drive circuit TFT. Thereafter, an ITO is deposited on the overall surface over the substrate including the passivation layer 300 and then patterned to form a pixel electrode 15 connected to drain electrode 11D through the contact hole, and a transparent conductive line 25 for connecting the TFTs at the drive circuit to each other through the contact holes.

After fabricating one LCD substrate, the other substrate having a common electrode and light-shielding layer is fabricated, and the two substrates are bonded to each other. Then, a liquid crystal is injected between the two plates to complete the TFT-LCD of the present invention.

In the above-described embodiment of the present invention, the pixel TFT is formed with an N-type. However, if the pixel TFT is formed with a P-type, the P-type TFT at the drive circuit is formed to have the same structure as the pixel TFT. This structure can be obtained through the process shown in FIGS. 6A to 6E. However, in this case, N-type impurities are replaced by P-type impurities. Thus, according to the preferred embodiment, the pixel TFT has an N or P-type channel. The pixel TFT is formed as a stagger or coplanar structure. If the pixel TFT is an N-type and formed as the stagger structure, the N-type TFT at the drive circuit is formed as the stagger structure as well.

As described above in the present invention, the drive circuit TFT and the pixel TFT have the same structure where the channel conductivity is the same. In particular, if the channel region at the drive circuit TFT has the same conductivity as the pixel TFT, the pixel TFT is preferably formed as the stagger type. Conversely, if the drive circuit TFT has the opposite conductivity to the pixel TFT, it is preferably formed as a coplanar type. Thus, the number of photolithography steps is reduced. Accordingly, the TFT-LCD fabrication process step is simplified to improve the production yield.

Accordingly, in the present invention, an N-type TFT and a P-type TFT preferably have different structures from each other and form a complementary TFT at the drive circuit. The pixel TFT and the drive circuit having the CMOS-TFT are formed in the same substrate to reduce the number of process steps, thereby improving productivity.

It will be apparent to those skilled in the art that various modifications and variations can be made in the LCD and a method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
   a plurality of pixel TFTs in a matrix form on an insulating substrate;
   a plurality of drive circuit TFTs having a CMOS structure on a peripheral portion of the pixel TFTS, the drive circuit TFTs including a first conductivity type TFTs having a same structure as the pixel TFTs and a second conductivity type TFT having a structure different from the pixel TFTs;
   a plurality of signal lines connected to the pixel TFTS; and
   a plurality of scanning lines crossing the signal lines.

2. The liquid crystal display according to claim 1, wherein the first conductivity type TFT has a same conductivity type as channels of the pixel TFTs, and the second conductivity type TFT has an opposite conductivity to the channels of the pixel TFTs.

3. The liquid crystal display according to claim 2, wherein the pixel TFTs include source and drain electrodes below an active layer.

4. The liquid crystal display according to claim 2, wherein the pixel TFTs include source and drain electrodes on an active layer.

5. The liquid crystal display according to claim 1, wherein the pixel TFTs have an N-type channel.

6. The liquid crystal display according to claim 1, wherein the pixel TFTs have a P-type channel.

7. The liquid crystal display according to claim 1, wherein the pixel TFTS include one of an LDD region and an offset region.

8. The liquid crystal display according to claim 1, wherein the pixel TFTs include the source and drain electrodes having a dual-level layer.

9. The liquid crystal display according to claim 8, wherein the dual-level layer includes a semiconductor layer and a metal layer.

10. The liquid crystal display according to claim 1, further comprising a first storage capacitor electrode extending from the source electrode of the pixel TFTs and a second storage capacitor electrode adjacent to the first storage capacitor electrode.

11. The liquid crystal display according to claim 10, wherein the second storage capacitor electrode includes a same material as the scanning lines.

12. The liquid crystal display according to claim 1, wherein the pixel TFTs have a stagger structure.

13. The liquid crystal display according to claim 1, wherein the pixel TFTs have a coplanar structure.

14. A liquid crystal display comprising:
    a plurality of pixel TFTs in a matrix form on an insulating substrate, the pixel TFTs having one of an LDD region and an offset region;
    a storage capacitor coupled to the pixel TFTS, the storage capacitor including a first storage node capacitor electrode extending from a source electrode of each of the pixel TFTs and a second storage capacitor electrode adjacent to the first storage capacitor electrode;
    a plurality of drive circuit TFTs having a CMOS structure on a peripheral portion of the pixel TFTS, the drive circuit TFTs including a first conductivity type TFT having a same conductivity type as channels of the pixel TFTs and a second conductivity type TFT having an opposite conductivity to the channels of the pixel TFTS, the first conductivity type TFTs having a same structure as the pixel TFTs and the second conductivity type TFTs having a structure different from the pixel TFTS;
    a plurality of signal lines connected to the pixel TFTs; and
    a plurality of scanning lines crossing the signal lines.

15. The liquid crystal display according to claim 14, wherein the first conductivity type TFT has portions of source and drain electrodes below an active layer, and the second conductivity type TFT has source and drain regions as the active layer.

16. The liquid crystal display according to claim 14, wherein the pixel TFTs have an N-type channel.

17. The liquid crystal display according to claim 14, wherein the pixel TFTs have a P-type channel.

18. The liquid crystal display according to claim 14, wherein the first storage capacitor electrode includes a dual-level layer including a semiconductor layer and a metal layer.

19. The liquid crystal display according to claim 14, wherein the second storage capacitor electrode includes a same material as the scanning lines.

20. A liquid crystal display comprising:
    a gate drive circuit having complementary thin film transistors; and
    a data drive circuit adjacent to the gate drive circuit and having complementary thin film transistors, wherein
    the complementary thin film transistors of the gate and data drive circuits include a first conductivity type TFT having a stagger structure and a second conductivity type TFT having a coplanar structure.

21. A method of fabricating a liquid crystal display including a pixel portion having a pixel TFT and a drive circuit portion having a first conductivity type TFT and a second conductivity type TFT, the method comprising the steps of:
    forming a first semiconductor layer and a first metal layer over a substrate;
    patterning the first semiconductor layer and the first metal layer to form source and drain electrodes for the pixel TFT at the pixel portion and the first conductivity type TFT at the drive circuit portion, the first conductivity type TFT having a same conductivity as a channel of the pixel TFT;
    forming an active layer on an exposed surface over the substrate;
    patterning the active layer for the pixel TFT and the first and second conductivity type TFTs;

forming a first insulating layer and a second metal layer on an exposed surface over the substrate;

patterning the first insulating layer and the second metal layer to form gate electrodes on the active layer of the pixel TFT and the first and second conductivity type TFTs;

injecting a first impurity of a first conductivity type into the active layer using the gate electrodes as masks;

injecting a second impurity of a second conductivity type into the active layer of the second conductivity type TFT at the drive circuit portion to form source and drain regions of the second conductivity type TFT, the second impurity being doped with a concentration higher than that of the first impurity;

forming a passivation layer over an exposed surface of the substrate;

patterning the passivation layer to form contact holes over the drain electrode of the pixel TFT, source and drain electrodes of the first conductivity type TFT, and source and drain electrodes of the second conductivity type TFT;

forming a transparent conductive layer over the passivation layer; and patterning the transparent conductive layer to form a pixel electrode and a transparent conductive line, the pixel electrode being connected to the drain electrode of the pixel TFT through one of the contact holes and the transparent conductive line connecting the first conductivity type TFT with the second conductivity type TFT through respective contact holes to form a CMOS-TFT at the drive circuit portion.

22. The method according to claim 21, wherein the first conductivity type TFT is an N-type and the second conductivity type TFT is a P-type.

23. The method according to claim 21, wherein the step of forming the active layer includes forming a polysilicon layer.

24. The method according to claim 21, wherein the step of forming the active layer includes the steps of:

forming an amorphous silicon layer; and crystallizing the amorphous silicon layer.

25. The method according to claim 21, wherein the step of forming the second metal layer includes forming at least one of aluminum, chromium, and semiconductor layer.

26. The method according to 21, wherein the first impurity includes an N-type impurity.

27. The method according to 21, wherein the second impurity includes a P-type impurity.

28. The method according to claim 21, wherein the step of patterning the second metal layer to form the gate electrodes on the active layer includes the step of forming a storage capacitor electrode above the drain electrode of the pixel TFT, the storage capacitor electrode and the drain electrode of the pixel TFT forming a storage capacitor using a portion of the first insulating layer as a dielectric.

29. The method according to claim 21, wherein the step of forming the gate electrodes on the active layer includes the steps of:

substantially not superposing the channel on the source and drain electrodes of the pixel TFT; and substantially superposing a channel of the first conductivity type TFT on the source and drain electrodes of the first conductivity type TFT of the drive circuit portion.

30. A method for fabricating a liquid crystal display, the method comprising the steps of:

forming a gate drive circuit having first complementary thin film transistors, the first complementary thin film transistors being formed with a first conductivity type TFT having a stagger structure and a second conductivity type TFT having a coplanar structure; and forming a data drive circuit having second complementary thin film transistors, the second complementary thin film transistors being formed with a first conductivity type TFT having a stagger structure and a second conductivity type TFT have a coplanar structure.

* * * * *